United States Patent
Hochwarth et al.

(10) Patent No.: US 11,159,654 B2
(45) Date of Patent: Oct. 26, 2021

(54) METHOD AND SYSTEM FOR DATA TRANSFER ON AN AVIONICS BUS

(71) Applicant: GE AVIATION SYSTEMS LLC, Grand Rapids, MI (US)

(72) Inventors: Joachim Karl Ulf Hochwarth, Caledonia, MI (US); Benjamin Harvey Bennink, Coopersville, MI (US); MacKenzie Dylan Cumings, Wyoming, MI (US); Victor Mario Leal Herrera, Querétaro (MX)

(73) Assignee: GE Aviation Systems LLC, Grand Rapids, MI (US)

( * ) Notice: Subject to any disclaimer, the term of this patent is extended or adjusted under 35 U.S.C. 154(b) by 139 days.

(21) Appl. No.: 16/682,765

(22) Filed: Nov. 13, 2019

(65) Prior Publication Data

US 2021/0144236 A1    May 13, 2021

(51) Int. Cl.
| | |
|---|---|
| *H04L 29/06* | (2006.01) |
| *H04L 29/08* | (2006.01) |
| *B64D 43/00* | (2006.01) |
| *H04L 1/00* | (2006.01) |

(52) U.S. Cl.
CPC .............. *H04L 69/22* (2013.01); *B64D 43/00* (2013.01); *H04L 1/0061* (2013.01); *H04L 67/12* (2013.01); *H04L 69/324* (2013.01)

(58) Field of Classification Search
None
See application file for complete search history.

(56) References Cited

U.S. PATENT DOCUMENTS

| | | | |
|---|---|---|---|
| 4,943,919 A | 7/1990 | Aslin et al. | |
| 5,167,020 A | 11/1992 | Kahn et al. | |
| 5,481,254 A * | 1/1996 | Gaskill | H04W 88/187 340/7.46 |
| 5,886,992 A * | 3/1999 | Raatikainen | H04L 12/43 370/410 |
| 7,970,410 B2 | 6/2011 | Brinkley et al. | |
| 8,271,709 B2 | 9/2012 | Rittmueller | |
| 8,335,609 B2 | 12/2012 | Beacham et al. | |
| 8,451,860 B2 | 5/2013 | Kinstler | |
| 8,621,473 B2 * | 12/2013 | Miller | G06F 9/4887 718/102 |

(Continued)

FOREIGN PATENT DOCUMENTS

EP     1363439 A1   11/2003

OTHER PUBLICATIONS

Anonymous, "Chapter 8: Digital Data Bus Acquisition Formatting Standard", IRIG 106-19 (Telemetry Standards, RCC Standard 106-19), Jul. 1, 2019, pp. 1-16, XP055772529.

(Continued)

*Primary Examiner* — Duc T Duong
(74) *Attorney, Agent, or Firm* — McGarry Bair PC

(57) ABSTRACT

A method for transmitting a set of conforming data frames in a specialized data network, the method comprising generating a specialized header, providing the specialized header to a data destination, generating a set of conforming data frames, providing at least a subset of the conforming data frames to the data destination, identifying the subset of conforming data frames, and performing processing operations on the stored subset of conforming data frame.

20 Claims, 6 Drawing Sheets

(56) References Cited

U.S. PATENT DOCUMENTS

| | | | |
|---|---|---|---|
| 8,761,181 B1* | 6/2014 | Gostev | H04L 1/1829 370/393 |
| 10,334,081 B2 | 6/2019 | Liu et al. | |
| 2009/0259885 A1* | 10/2009 | O'Connell | G06F 11/184 714/12 |
| 2010/0074253 A1* | 3/2010 | Cheriyath | H04B 7/18506 370/389 |
| 2017/0242910 A1 | 8/2017 | Hochwarth et al. | |
| 2017/0327242 A1 | 11/2017 | Lopez et al. | |
| 2019/0132147 A1* | 5/2019 | Chen | H04L 12/40032 |
| 2021/0136783 A1* | 5/2021 | Fakoorian | H04W 72/0406 |

OTHER PUBLICATIONS

Airlines Electronic Engineering Committee: "ARINC—network server system: ARINC characteristic 763-2", Nov. 21, 2001, pp. 1-79, XP002988393.

\* cited by examiner

METHOD AND SYSTEM FOR DATA TRANSFER ON AN AVIONICS BUS

TECHNICAL FIELD

This disclosure relates generally to the data transfer between a data source and a data destination, and more specifically to the method of increasing the size of the data payload of the data transfer.

BACKGROUND

For contemporary aircraft, an avionics 'platform' includes of a variety of elements such as sensors, data concentrators, a data communications network, radio frequency sensors and communication equipment, computational elements, operational or functional elements, and graphical displays. These components can share information with other components over the data communications network.

Transfer of platform elements data can either be periodic or aperiodic, meaning that data can be sent to a destination, or multiple destinations in either scheduled packages, or on demand from a user or other outside source. During operation, the platform element data can be identified by destination, supply the payload information to the destination, and perform an error check for each payload. In some instances, specialized data networks, such as Aeronautical Radio Inc. (ARINC) compliant data networks, can define standards or specifications for network operations, including data transmissions. Current ARINC specifications can be inefficient in the packaging of this information, and as a result, can decrease the transmission efficiency of the data communications network. For example, an ARINC 429 compliant data network or system can allow for 18 bits out of a total 32 bits per label or word for the payload to be relayed or transmitted to the destination.

Network components utilized to construct the data network can utilize a specialized data network protocol, hardware including relays, switches, communicative connections, and the like, to ensure performance of the network architecture for the specialized data, as for example, under the performance of the network communications defined by various data network specifications.

BRIEF DESCRIPTION

In one aspect, aspects of the disclosure relate to a method for transmitting a set of conforming data frames in a specialized data network, the method comprising: generating, at a data source, at least one specialized header frame indicating imminent data transfer of the set of conforming data frames, providing the at least one specialized header frame to a data destination, by way of the specialized data network, generating, at the data source, the set of conforming data frames, wherein each of the set of conforming data frames is indicated as one of the set of conforming data frames by a single bit indicator, providing at least a subset of the conforming data frames to the data destination, by way of the specialized data network, identifying the subset of conforming data frames, by the data destination, by way of the single bit indicator of each of the subset of conforming data frames, and storing the subset of the conforming data frames identified, and performing processing operations on the stored subset of conforming data frames.

In another aspect, aspects of the disclosure relate to an avionics-specific specialized data network, comprising: a data source configured to, generate at least one specialized header frame indicating imminent data transfer of a set of conforming data frames, transmit the at least one specialized header frame to the data network, generate the set of conforming data frames, wherein each of the set of conforming data frames is indicated as one of the set of conforming data frames by a single bit indicator, transmit at least a subset of the conforming data frames to the data network, and a data destination configured to: receive a transmission of the at least one specialized header frame from the data network, begin listening for the at least a subset of the conforming data frames by identifying data frames received from the data network based on the single bit indicator of each data frame received, store the subset of conforming data frames received when the single bit indicator identifies the received data frame is one of the set of conforming data frames, and performing processing on the stored subset of conforming data frames.

DETAILED DESCRIPTION

Figure 1:
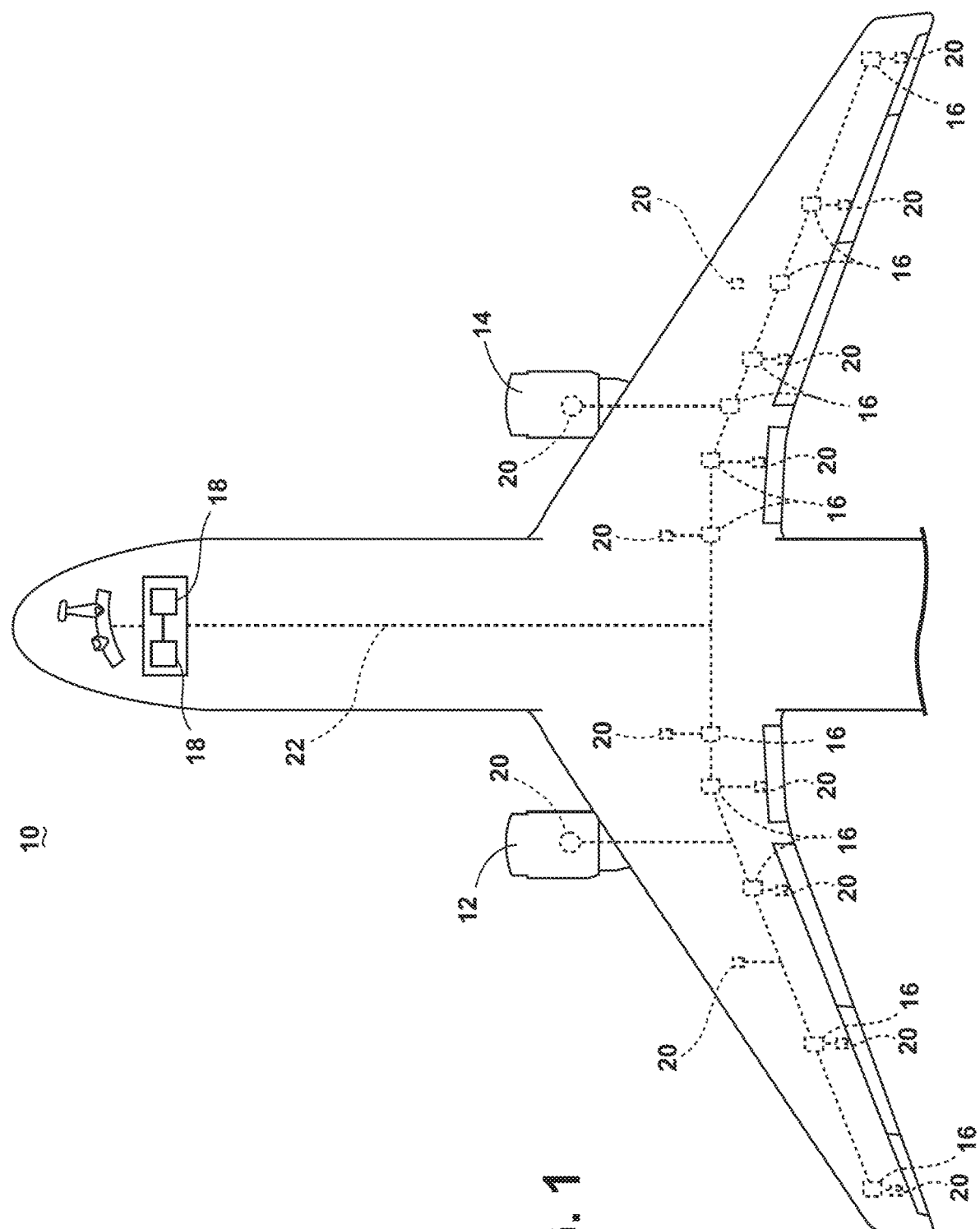
FIG. 1 is a top down schematic view of an example aircraft and avionics data network architecture of an aircraft, in accordance with various aspects described herein.

Aspects of the disclosure described herein are provided with respect to a specialized avionics data protocol, but it will be understood that the apparatus and method described herein can be implemented in any environment using a data communications network interconnecting a set of data-generating components with a set of data-consuming components. Aspects of the disclosure can include data communications networks configured to operate according to defined network characteristics or specifications. For example, contemporary aircraft operate a set of components interconnected by way of a data network defined by a network standard, such as the ARINC, or a subdivision thereof, for example ARINC 429 (A429) specification, incorporated herein in its entirety. While aspects of the disclosure refer to the A429 specification, aspects of the disclosure are applicable to other specialized data networks, including, but not limited to the ARINC 664 specification, the ARINC 825 CAN bus specification, or the like. The A429 specification defines compliant network operations including, but not limited to, redundancy, dedicated bandwidth, and deterministic quality of service. In another non-limiting example, a specialized data network can include compliant network operations including network switching performance. While aspects of the disclosure are described with respect to the A429 specification or A429 data frames, transmissions, and the like, the disclosure can be applicable to any specialized data network, compliant data network, avionics data network, or the like utilized for data transmissions between a set of interconnected data sources and data destinations. As used herein, "compliant" is used to denote conformance (or conforming) to the specification of the specialized data network to enable operation of the specialized data network. For example, a "compliant" data transmission will be carried or otherwise delivered from a data source to a data destination. In contrast, a "non-compliant" data transmission may not be delivered, and the non-compliant data transmission may be eliminated, ignored, dropped, or otherwise discarded during or prior to transmission.

Additional, updated or new network standards can be incorporated into contemporary aircraft in order to operate the set of interconnected components. In some instances, it is desirable to ensure the updated or new network standards are compatible with legacy or future systems, including but not limited to the A429 specification, or A429 data transmissions.

Furthermore, as used herein, the term "set" or a "set" of elements can be any number of elements, including only one. Also, as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value.

All directional references (e.g., radial, axial, upper, lower, upward, downward, left, right, lateral, front, back, top, bottom, above, below, vertical, horizontal, clockwise, counterclockwise) are only used for identification purposes to aid the reader's understanding of the disclosure, and do not create limitations, particularly as to the position, orientation, or use thereof. Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection or communicative connection between respective elements. Additionally, as used herein, "electrical connection" or "electrically coupled" can include a wired or wireless power or data (e.g. communicative or transmissive) connection between respective components.

Additionally, as used herein, a "controller" or "controller module" can include a component configured or adapted to provide instruction, control, operation, or any form of communication for operable components to affect the operation thereof. A controller module can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), a hardware-accelerated logic controller (e.g. for encoding, decoding, transcoding, etc.), the like, or a combination thereof. Non-limiting examples of a controller module can be configured or adapted to run, operate, or otherwise execute program code to affect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller module can also include a data storage component accessible by the processor, including memory, whether transient volatile or non-transient, or non-volatile memory. Additional non-limiting examples of the memory can include random access memory (RAM), read-only memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to affect a functional or operable outcome, as described herein.

The exemplary drawings are for purposes of illustration only and the dimensions, positions, order and relative sizes reflected in the drawings attached hereto can vary.

As illustrated in FIG. 1, an aircraft 10 can include at least one propulsion engine, shown as a left engine system 12 and right engine system 14. The aircraft 10 can further include one or more data sources, that is, components that create, originate, or otherwise generate data, and data destinations, that is, components that receive, consume, process, or otherwise act on or effect an outcome or operation based on data received. As shown, the aircraft 10 can include a data destination 18 or receiver, including, but not limited to data storage or processing units, or functional systems such as the flight management system (FMS) or autopilot system, and a data source 20, such as a set of fixed aircraft components, such as line-replaceable units (LRUs) 21, networking end nodes, or modular components of a vehicle or aircraft. Alternatively, there can be two or more data destinations 18, or two or more data sources 20 at various locations throughout the aircraft 10. Non-limiting examples of data sources 20 can include sensors, a system, an electronic flight bag (EFB), or the like. Similarly, non-limiting examples of the data destination 18 can be various components of an aircraft 10 such as an aircraft computer, the LRU 21, the electronic flight bag (EFB), a memory storage unit, or any other known component adapted to receive aircraft information. In the aircraft environment, the data destination 18, or the data source 20 can be designed to operate according to a particular operation, interoperability, or form factor standards, such as those defined by ARINC series standards. In the exemplary aspects illustrated, the data destination 18 can be positioned near the nose, cockpit, or pilot of the aircraft 10 and the data source 20 can be positioned at various locations throughout the aircraft 10, however, any relative arrangement can be included.

The data destinations 18 and data source 20 can be configured to be communicatively coupled by way of a series of transmission pathways 22, network relays, or network switches 16. While network switches 16 are schematically illustrated, non-limiting aspects of the disclosure can be applied to peer-to-peer networks. The transmission pathways 22 can include a physical connection between the data source 20, and the data destination 18, such as a wired connection including Ethernet, or can include wireless transmission connections, including, but not limited to, WiFi (e.g. 802.11 networks), Bluetooth, and the like. Collectively, the data destination 18, data source 20, transmission pathways 22, and switches 16 can form an avionics data network, or avionics-specific data network for the aircraft.

The aircraft 10, and the systems thereof, can be communicatively interconnected by way of the avionics-specific data network such has an ARINC-compatible data network. The avionics-specific data network can be an ARINC 429 (A429) compatible data network. It will be appreciated that the aircraft 10, and the systems thereof can be any avionics-specific data network compatible with any ARINC data network, or any other known avionics-specific data network.

The data source 20 can include, for example, entirely contained systems, sensors, radios, or other auxiliary equipment to manage or operate aircraft functions. At least a set of data destination 18 or data source 20 can, for example, generate data, which can be modified, computed, or processed prior to, or in preparation for packaging the data into data frames to be transmitted over the avionics data network by way of the transmission pathways 22 or switches 16. At least another set of data destination 18 or data source 20 can, for example, consume the data transmitted over the avionics data network. In some instances, a single data destination 18 or data source 20 can operate to both generate and consume data. As used herein, "consume," "consuming," or "consumption" of data will be understood to include, but is not limited to, performing or executing a computer program, routine, calculation, or process on at least a portion of the data, storing the data in memory, or otherwise making use of at least a portion of the data.

The data source 20, and the data destination 18 can include non-stationary data sources. As used herein, "non-stationary" means any device that can be moveable relative to the aircraft or data network, such as carried by one the flight crew from one location to another either on, or off the aircraft 10, compared with a "stationary" data source or "stationary" data destination that can include devices that are generally fixed or incorporated into the aircraft 10 and would require significant work or maintenance services to remove from the aircraft 10. For example, a non-stationary data destination 18, or data source 20 can be the EFB. The EFB can include a handheld device such as a tablet, palm-pilot, pager, portable computer, smart device, or the like, that can be carried onto the aircraft 10 by the flight crew. In contrast, a stationary data destination 18 can be, for example, a cockpit display, cockpit computer, or the like.

The data destination 18 can be utilized to receive aperiodic data transmissions, including, but not limited to, flight plan data transmitted to a data source 20 such as such as, but not limited to, an avionics device including a central processing unit.

The illustrated aircraft 10 is merely one non-limiting example of an aircraft 10 that can be used in aspects of the disclosure described herein. Particularities of the illustrated aircraft 10 aspects, including relative size, length, number of engines, type of engines, and location of various components are not germane to the aspects of the disclosure, unless otherwise noted.

In some example components, such as the data destination 18 or data source 20, the components can be removably fixed to the aircraft for maintenance, diagnostics, or repair purposes, but statically fixed during, for example, flight. Additionally, while the data destination 18 and the data source 20 are described, any data generating or data receiving or consuming components fixed relative to an aircraft can be included as aspects of the disclosure as fixed components. For example, systems such as an FMS, primary flight display, cockpit display system, autopilot, or autoland systems can be considered fixed components, as used herein.

Figure 2:
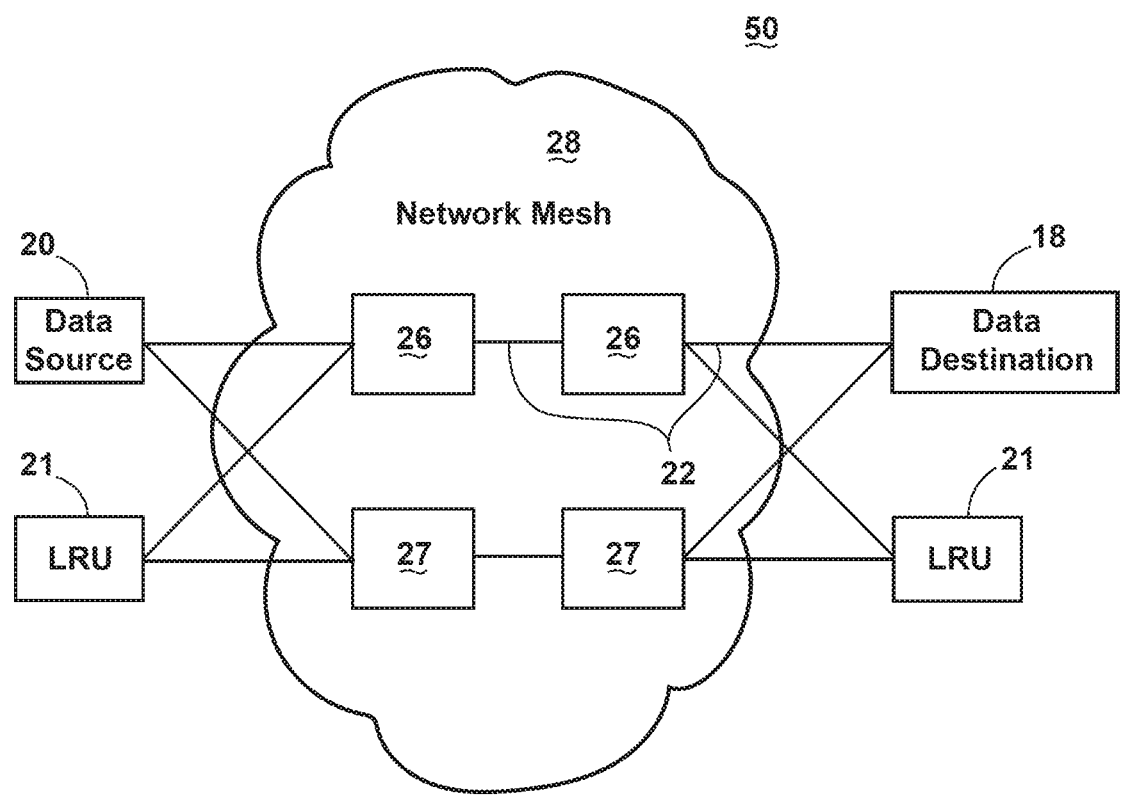
FIG. 2 is a schematic view of an example avionics data network of FIG. 1, in accordance with various aspects described herein.

FIG. 2 illustrates a non-limiting schematic view of a specialized data network 50 according to aspects of the disclosure. The specialized data network 50 can include various components, and perform the functions of an avionics data network outlined herein. The specialized data network can include, but is not limited to, a set of redundant network switching units, such as a first set of switching units 26 defining a first path and a second set of switching units 27 defining a second, or redundant, path. The first and second switching units 26, 27 collectively define a network mesh 28 for routing the transmission of data frames between respective components, such as to and from the data destination 18, and data source 20 data sources 20 via the transmission pathways 22. The network mesh 28 is further shown having a set of transmission pathways 22 between the network switching units 26 to provide redundancy in transmission pathways 22. In one non-limiting example, the network mesh 28, the first set of switching units 26, the second set of switching units 27, or a combination thereof, can be arranged, configured, or otherwise enabled to utilize a specialized data network 50 transmission schema. The aspects of the disclosure illustrated in FIG. 2 is merely one representation of the specialized data network 50, and alternative configurations, organization, and component quantities, including, but not limited to, data destination 18, data source 20, or network switching units 26, are envisioned.

The data source 20 can be operatively coupled to the specialized data network 50 such that it can transmit data based off of various avionic systems to the data destination 18, or other destinations such as the LRU 21.

Figure 3:
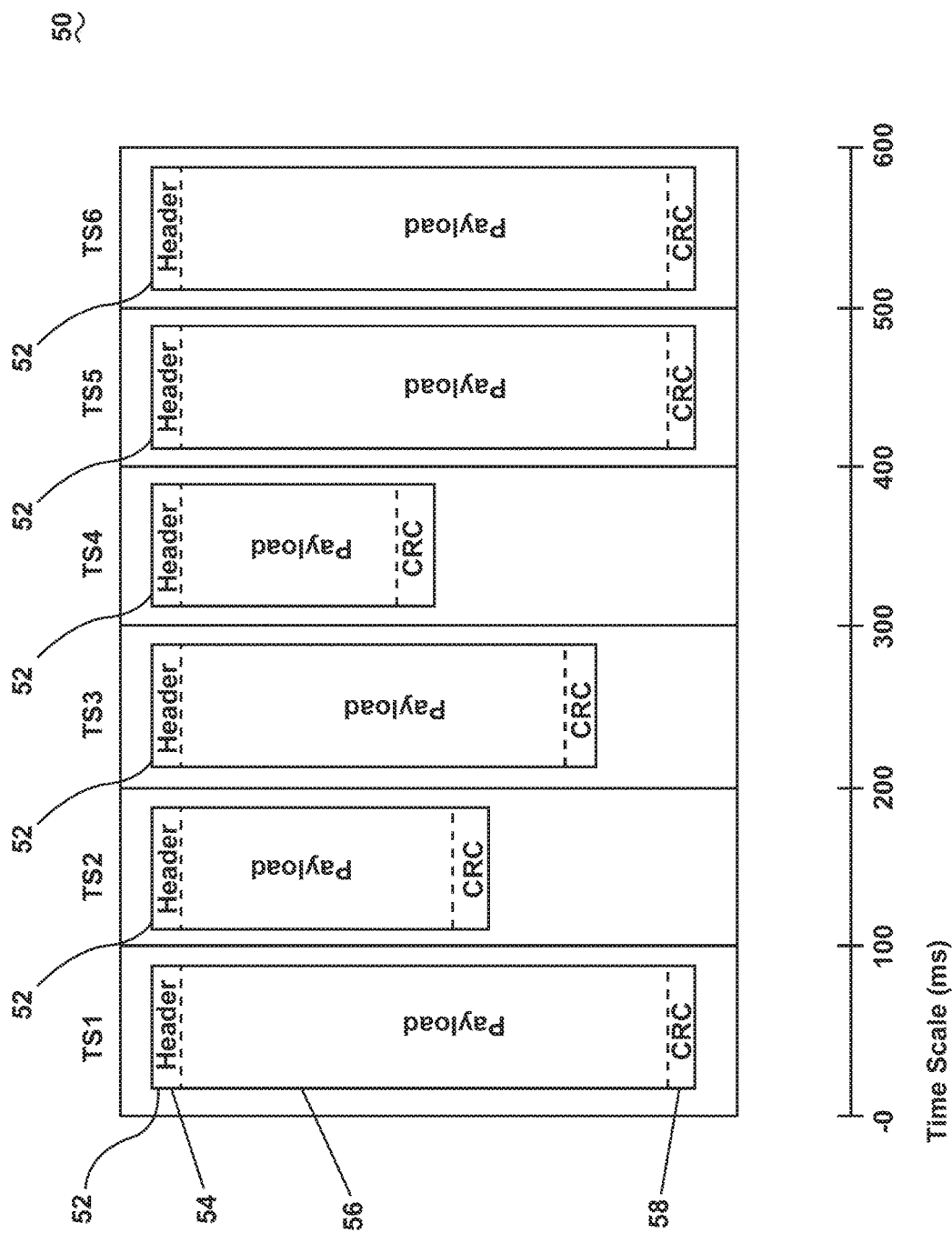
FIG. 3 is a schematic view of a set of data transmissions of the specialized data network, in accordance with various aspects described herein.

FIG. 3 is a non-limiting example of a set of data transmissions in the specialized data network 50 of FIG. 2, arranged relative to a time scale during which the set of data transmissions are provided to the specialized data network 50. The specialized data network 50 can include one or more time slots TS1-TS6 to receive one or more data transmissions, or transmissions of data frames. The specialized data network 50 can include multiple specialized sets of conforming data frames 52 that can be transmitted over a time scale. As used herein, "conforming" data frames means any set of data transmitted through the specialized data network 50 that conforms with the various system requirements such as, but not limited to, those outlined by the various ARINC specifications, and are thus, delivered or deliverable by the specialized data network 50, while "nonconforming" data frames can include any set of data sent through the specialized data network 50 that does not meet the various system requirements such as, but not limited to, those outlined by the various ARINC specifications such that they will not be delivered or deliverable. Stated another way, the specialized data network 50 has specific requirements that can be followed for a respective data frame to be "conforming,"

otherwise the respective transmission of the data frame will not occur. In the present example, the time scale can be over a 600 ms time frame or period of time wherein each of the time slots TS1-TS6 can be 100 ms.

Each conforming data frame 52 can include in this instance, for example, a specialized header 54, payload data 56, and an optional error check component, shown as an optional cyclic redundancy check (CRC) 58. Alternatively, each of the conforming data frame 52 can include any number of specialized headers 54, payloads 56, or CRCs 58.

The specialized header 54 can include various identifying information that can inform the data destination 18 of the characteristics of the data being transmitted from the data source 20, the target destination of the conforming data frame 52, the encoding of the conforming data frame 52, or the like. The specialized header 54 is discussed in greater detail herein.

The payload data 56 can be any data transmitted from the data source 20, or an input from an outside source. The transmitted data can include, for instance, an altitude, a flight plan, a maintenance database, an external temperature, a pressure reading, a speed reading, a fuel level, or any other data or input provided from the data source 20. It will be appreciated that the payload can be any data utilized in the operation of the aircraft 10, or a system therein. The conforming data frame 52 can include any one of internal FMS data such as, but not limited to, a predicted flight path, the flight plan, maintenance log, maintenance database, or the like.

The CRC 58 can be implemented into the conforming data frame 52 to ensure that potential errors in the data are detected. The CRC 58 can be performed by a processor, or microcontroller that ensures that the data being sent by the data source 20 to the data destination 18 does not include any potential errors. On the transmitting end, the data source 20 utilizes the CRC 58 to create a check or verification code that is compared to the CRC 58 check or verification code that is created at the receiving end, or data destination 18. If the check or verification codes do not match, the data destination 18, can request that the data source 20 retransmit the conforming data frame 52, or the data destination 18, can ignore the conforming data frame 52. Alternatively, the data destination 18 can inform the specialized data network 50 of the faulty data, and the specialized data network can then notify a user of the aircraft 10, or a ground operator of the faulty condition via a user interface (not shown), or any other notification device.

The conforming data frame 52 can be on either a periodic schedule, or an aperiodic schedule. As used herein, "periodic schedule" can include any data from a data source 20 that is transmitted during a predetermined time-frame. For example, periodic schedule conforming data frames 52 can include repeated, schedule transmissions such as airspeed and altitude. In contrast, "aperiodic schedule" conforming data frames 52 can be any data source 20 that is transmitted "on-demand" or on a non-predetermined regular or repeating time frame, such as in response to an event (e.g. "event-driven" or a "triggered" event).

The conforming data frames 52 of the specialized data network 50 can be of differing sizes. For example, the conforming data frame 52 of the first time slot TS1 can take the entirety of the designated time to transmit its data from the data source 20, while the specialized data set of the second time slot TS2 can take half of the designated time to transmit its data from the data source 20. It will be appreciated that each conforming data frame 52 can be of varying sizes and can take more or less time to transmit its data form the data source 20 to the data destination 18. In one example, one or more of the sets of conforming data frames 52 can include both the specialized header 54, the payload data 56, and optionally, the CRC 58.

The specialized data network 50 can be a deterministic data network. The deterministic data network can be a specialized data network 50 considered to be a relatively reliable network in the sense that multiple redundancies and checks are built into the system to ensure that the correct, or unmodified data from the data source 20 is being transmitted to the correct data destination 18 at the correct time slot TS1-TS6. For instance, in one non-limiting example, a portion of data being transmitted from the data source 20 can be unintentionally or inadvertently modified by way of a single-event upset, such an electro-magnetic event, a solar flare, or the like. Additional "modifying" events can be included. Alternatively, the specialized data network 50 can be a broadcast-style bus. The broadcast-style network can be a specialized data network 50 that can transmit, or broadcast the data from the data source 20 to all receiving data destinations 18. In the case of the broadcast-style bus, the specialized data network 50 can define a time slot TS1-TS6 limiting the amount of time the data source 20 has to generate, or transmit the conforming data frame 52 and its applicable components to the data destination 18. In the instance of the broadcast-style bus, the specialized data network 50 can further be adapted such that a set of data destinations 18 not expect or receiving a subset of the conforming data frames 52 simply ignore that subset of conforming data frames 52.

Figure 4:
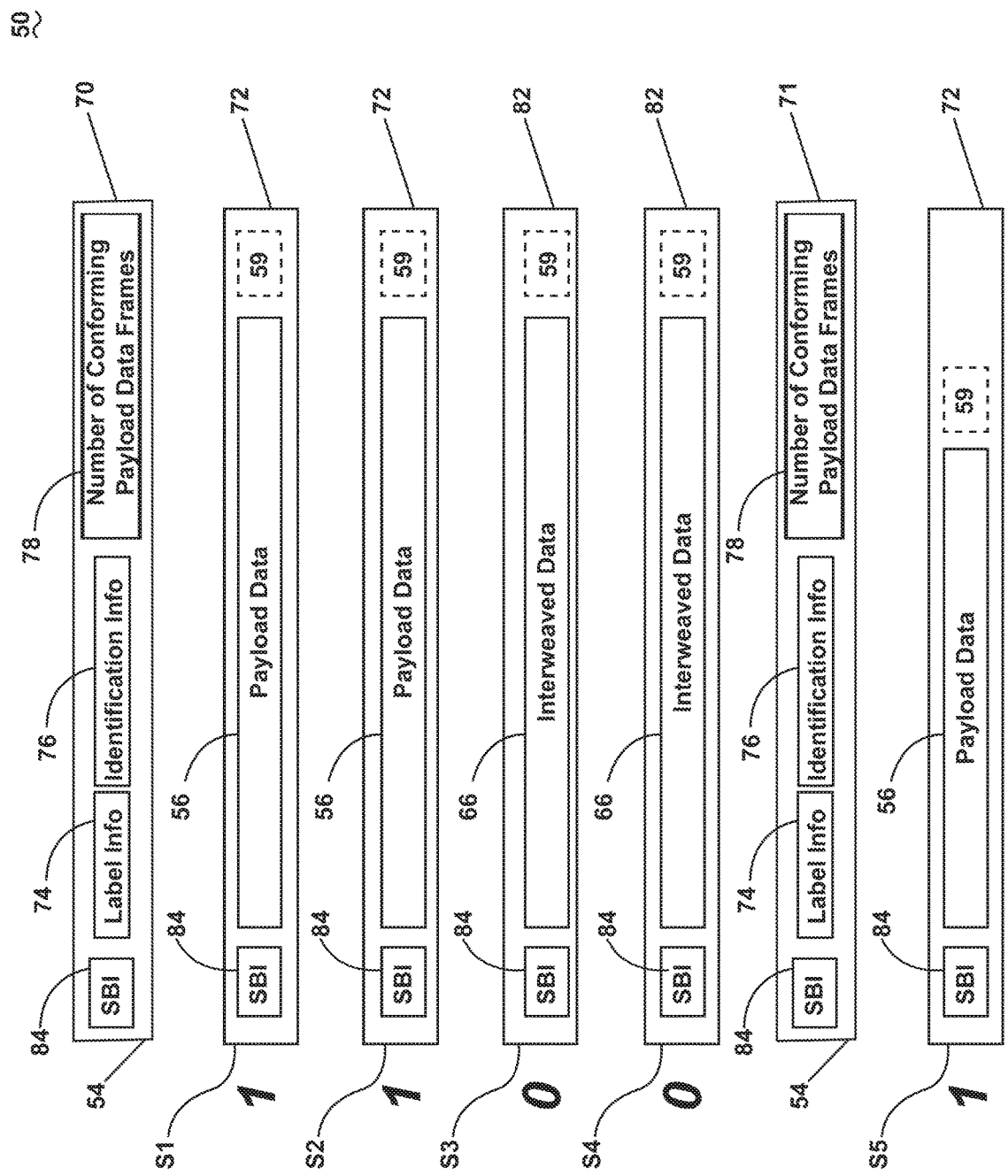
FIG. 4 is another schematic view of a set of data transmissions of the specialized data network, in accordance with various aspects described herein.

While FIG. 3 illustrated an example set of transmissions that spanned over multiple time slots (TS1-TS6), FIG. 4 illustrates another example set of transmissions, also in accordance with aspects of the specialized data networks, wherein a set of conforming data frames defining a larger set of payload data 56 spread over multiple frames (e.g. S1, S2, S5) can span over multiple data transmission time frames (not shown), including spanning over and between interweaved additional data (e.g. S3, S4, data not included as a portion of the set of conforming data frames). Stated another way, larger payload data 56 can be broken up and distributed over a set of conforming data frames 52 individually transmitted over the specialized data network 50, where, for instance, they can be reassembled at a data destination (not shown) into the overall contiguous payload data. This can occur when the payload data 56 is larger than a maximum amount of data that can be transmitted in a single time slot. In one non-limiting example, payload data that is too large to transmit in a single time slot can be an aperiodic transmission of data from the data source 20 to an avionics flight computer. As used herein, a set of data frames utilized with aspects of the disclosure described here will be referred to as "payload data frames."

The set of conforming data frames 52 can include a specialized header frame 70, and a set of specialized data frames, such as the described payload data frames 72. In one non-limiting example, the size of each conforming data frame of the specialized data network 50 can be 32 bits. Alternatively, the size of each conforming data frames the specialized data network 50 can be of any size.

The specialized header frame 70 can include the specialized header 54. The specialized header can include various identifying information such as, but not limited to, a label information 74, an identification information 76, a single bit indicator (SBI) 84 and a number of expected or to-be-delivered set of payload data frames 78. The label information 74 can include a sequence of numbers that can identify the groupings of data and distinguish one set or frame of conforming data from another set or frame of conforming data. The identification information 76 can be any identifying information such as, but not limited to, a data group number, a data sequence number, a data source 20 status, or any other identifying information. In another non-limiting example, the number of payload data frames 72 can be a real number that identifies the number of payload data frames 72 that are being, or will be, transmitted and containing the payload to be reassembled. For instance, in the illustrated example, the specialized header frame 70 or the number of payload data frames 72 can define that three conforming data frames (e.g. S1, S2, and S5) will be or are being transmitted to complete a data payload delivered over the three frames (S1, S2, S5) and reassembled by the data destination 18 (not shown). While a singular special header frame 70 is shown, non-limiting aspects of the disclosure can be included wherein each data frame, or a subset of conforming data frames, can include a specialized header frame 70 either preceding the respective data frame, or included as a header for that respective data frame.

The information contained within the specialized header frame 70 can be transmitted from the data source 20 to the data destination 18, to inform them on the size, type, and group numbers of the payload data frames 72.

The specialized header frame 70 can be defined to either be extended or shortened. In some instances, it can be beneficial to utilize a shortened specialized header frame 70 that can give the data destination 18 only identifying information of the conforming data frame 52, while in other instances it can be beneficial to use an extended specialized header frame 70 that can give the data destination 18 all identifying information of the expected payload data frames 72. In the case of the shortened specialized header frame 70, an SBI 84 can be used. In one non-limiting example, the SBI 84 can be included as one (or more) bit(s) of the header section or portion of a conforming data frame 52, and the remainder of the header section can include payload data. In this sense, a receiver of the conforming data frame 52 would know not to read or interpret the full header, but rather interpret the remainder of the header (e.g. the non-SBI 84 portion of the "header") as payload data.

The specialized data network 50 can transmit the specialized header frame 70. Upon receipt of the specialized header frame 70 by an intended data destination 18, the data destination 18 can receive and "read" the specialized header frame 70 to determine various identifying factors of the forthcoming payload data frames 72 to be received. The identifying factors can include, but not limited to, a size of the data or payload, a location of the taken data, a time or timestamp, or any other identifying information. In one non-limiting example the data destination 18, in response to receiving the specialized header frame 70, can be "primed" or "ready" itself to identify and receive the forthcoming set of payload data frames 72. In one non-limiting example, the set of payload data frames 72 can be identified or identifiable by way of a defined data characteristic of the payload data frames 72, such as each of the set of payload data frames 72, and specialized header frame 70 can include a predetermined indicator by way of the SBI 84. In this sense, the data destination 18 can then listen, or expect payload data, or identifying information from the data source 20 for as long as identified in, or identified by, the SBI 84. It will be appreciated that the SBI 84 of the specialized header frame(s) 70, and the payload data frame(s) 72 can both be used in the same way disclosed herein.

A subset of data frames S1-S5 can include one or more of payload data frames 72 indicated by the number "1", or interweaved data frames 82 indicated by the number "0" (e.g. data frames not included in the payload data frames 72 as defined herein, and wherein the identified SBI 84, which may just be a portion of the header of the interweaved data frames 82 indicates the interweaved data frame 82 as not included in the set of payload data frames 72). In this sense, the interweaved data frames 82 can be interwoven with the payload data frame 72 transmissions on the specialized data network 50, and will be ignored or not acted upon by data destinations 18 expecting or receiving the payload data frames. The ARINC system can have a predetermined configuration that can indicate to the data destination 18 of what SBI 84 indicates the payload data frames 72, and which SBI 84 indicates the interweaved data frames 82. The interweaved data frames 82 can reference an interweaved specialized header frame (not shown) in the same way that the payload data frames 72 can reference the specialized header frame 70. The interweaved specialized header frame can include the SBI 84 that can indicate it as being the interweaved specialized header frame, such that the data destination 20 can treat the interweaved specialized header frame in the same way that it treats the interweaved data frame 72 outlined herein.

The number of payload data frames 72 identified in the specialized header frame 70 can match the number of payload data frames 72 received or requested by the data destination 18 from the data source 20.

The payload data frames 72, and interweaved data frames 82 can be identified by the data destination(s) 18 as relevant or non-relevant data by way of the SBI 84. The SBI 84 can most simply be a single bit binary identifier. For instance, an SBI 84 of binary one can indicate the received or transmitted data frame as a payload data frame 72, while an SBI 84 of binary zero can indicate the received or transmitted data frame as interweaved data frames 82, or simply non-payload data frames 72 as explained herein. Alternatively, this relationship can be flipped such that an the SBI 84 of binary zero can indicate the received or transmitted data frame as a payload data frame 72, while the SBI 84 of binary one can indicate a received or transmitted data frame as interweaved data frames 82. While a single bit indicator 84 is described, non-limiting aspects of the disclosure can be included wherein more than only one bit can be utilized to identify payload data frames 72 from interweaved data frame 82. An indicator that can have more than only one bit can be used to conform to any ARINC system specification. This concept is discussed further herein.

The specialized header frame 70 may further include a number of transmission subsets (not shown) defined by the number of separate data transmissions that will occur before the entirety of the payload data 56 has been received by the data destination 18. This can be included in instances where the data can be broken up over time, or when interweaved data frames 82 interrupt the data transmission. In either case, a second specialized header frame 71 can be transmitted to indicate to the data destination 18 that the incoming data transmissions refer back to, or continue from the payload data frames 72 already received by the data destination 18 that refer to or were indicated by the specialized header frame 70. For example, the specialized header frame 70 can indicate to the data destination that the there will be 4 transmission subsets to require the entirety of the payload data 72 to be transmitted. The second specialized header frame 71 can indicate that it is transmission subset 2 out of 4, the third specialized header frame (not shown) can indicate that it is transmission subset 3 out of 4, and the fourth specialized header frame (not shown) can indicate that it is transmission subset 4 out of 4. Alternatively, indicating the number of transmission subsets in the specialized header frame 70 can be forgone completely. For example, the entirety of the payload data 56 can be transmitted in a single transmission. In this case, the specialized header frame 70 can forgo indicating the number of transmission subsets as there is only one transmission. Alternatively, the data destination 18 can store the payload conforming data frames 72, and the specialized header frame 70 in internal memory (not shown) and utilize the SBI 84 of subsequent data transmissions, whether they are interrupted as outlined herein or not, to indicate whether or not they are the conforming data frames 72. It will be appreciated that many possibilities exist.

In the illustrated example, data subsets S1, S2, S5 can be the payload data frames 72 that can contain the payload data 56, and the data subsets S3, S4 can be the interweaved data frames 82 that can include one or more interweaved data payload 66. Each data subset S1, S2, S5 of the payload data frames 72 can be identified by, for example, an odd SBI 84 indicator or value, while each data subset S3, S4 of the interweaved data frames 82 can be identified by, for example, a different SBI 84 indicator or value, such as an even SBI 84 indicator or value. While odd and even indicators are described, alternative indicators, including but not limited to, flagging, true or false indicators, or the alternative indication (e.g. the payload data frames indicated by even SBI 84 indicator or value), can be included in aspects of the disclosure. It will be appreciated that that there can be any number of data subset S1-S5 with any number of payload data frames 72, or interweaved data frames 82.

In the illustrated example, the interweaved data frames 82 of the data subsets S3, S4 can include interweaved data payload 66 defined by data that does not match what the data destination 18 is currently searching for, or expecting to receive the CRC 58, or a parity bit 59. The parity bit 59 can be defined by a bit added to the end of a data frame that can ensure that the total number of 1-bits in the string is even or odd. The parity bit 59 can be used as a simple check bit at the end of a data frame, while the CRC 58 can be used as a more comprehensive check at the end of the data transmission. The payload data frames 72 of the data subsets S1, S2, S5 can include payload data 56 that the data destination 18 can receive and store for various avionic operations, the CRC 58, or the parity bit 59.

The data destination 18 can read the SBI 84 of each received data frame, and compare the SBI 84 received with a predetermined indicator of whether the data frame is one of the set of specialized data (e.g. the payload data frame 72 group identified). In one non-limiting example, it can be predetermined that an SBI 84 of binary one is indicative that the data frame received is one of the payload data frames 72, whereas it can be predetermined that an SBI 84 of binary zero is indicative that the data frame received is not one of the interweaved data frames 82. If the determination or comparison of the SBI 84 indicates a received data frame is one of the set of payload data frames 72, the data destination 18 can receive the payload data frame 72 and perform some additional function, such as storing the payload data in a memory, assembling the data into a contiguous data file, performing processing functions on the data, or the like. In one non-limiting example an EFB can receive flight data by way of aspects of the disclosure, and delivered by way of the set of payload data frames 72, wherein a flight computer can receive the flight data and, for instance, schedule or flight in accordance with a flight plan defined by the flight data. If the determination or comparison of the SBI 84 indicates a received data frame is not one of the set of payload data frames 72 and can therefore be the interweaved data frame 82, the data destination 18 can chose to ignore the interweaved data frames 82, or the interweaved specialized header frame and continue searching for, listening for, or determining whether future data frames received are part of the set of payload data frames 72. Alternatively, the data destination 18 can decide to inform the user of the avionics system of the interweaved data frame 82 via a user interface or any other known notification device.

The specialized data network 50 can allow for an increased number of bits dedicated to the payload data 56. Conventional data networks can require that a large portion (e.g., around 50%) of the data frame be used by the header, the CRC (or the parity bit), or a source/destination identifier (SDI) while the rest can be used for payload data transmission. The specialized data network 50 can utilize a specialized header 54 that can use a reduced number of bits (e.g., 1 bit in the case of the SBI 84, or lesser multiple bits when compared to the conventional data network) and the parity bit 59 which can be forgone altogether. Additionally, if the conforming data frame 72 includes a CRC 58, the CRC 58 can be interweaved with additional data (e.g., payload data 56). With that being said, in a 32 bit system, the specialized data network can utilize a maximum of 31 of the 32 bits for the payload data 56, or around 97% of the transmission can be used for the payload data 56.

Figure 5:
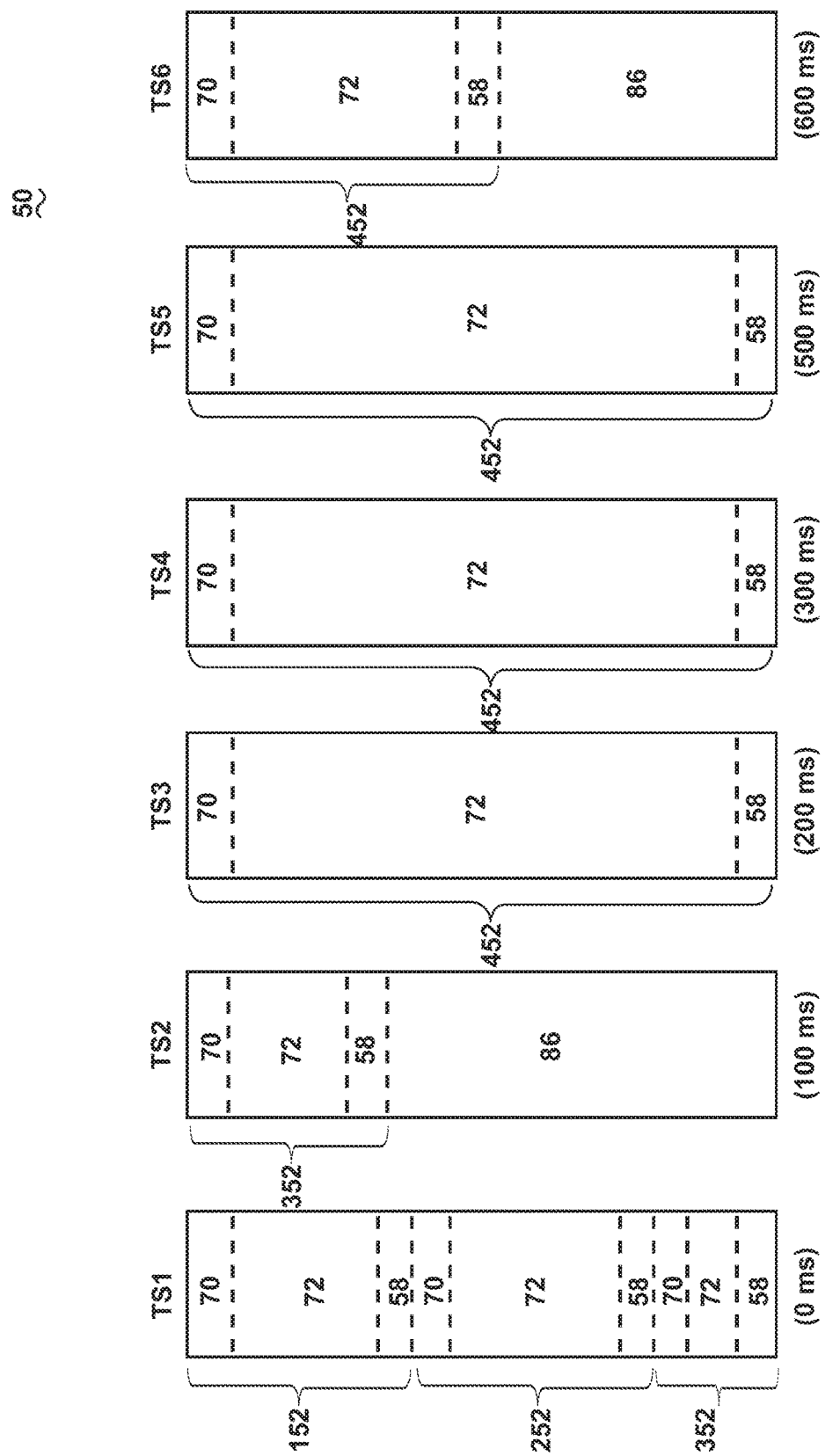
FIG. 5 is a schematic view of yet another set of data transmissions the specialized data network including multiple data sets spread throughout multiple frames, in accordance with various aspects described herein.

FIG. 5 is a schematic view of the specialized data network 50 that can include multiple data groups 152, 252, 352, 452 transmitted over multiple frames or time slots TS1-TS6. The data groups 152, 252, 352 can each be periodic data groups from different sensors, or locations around the aircraft 10. In contrast, the data frames 452 can include a larger data transmission that is broken up over multiple time slots, in accordance with aspects of the disclosure. In one non-limiting aspect, the data frames 452 can include data being transmitted across the specialized data network 50 from the flight computer to the EFB. The data frames 452 can be either aperiodic or periodic Each data group 152, 252, 352, 452 can indicate to the data destination 18 of the origin, size, and type of the data or respective payloads. The data frames 452 can include the aforementioned information as part of the specialized header frame(s) 70. While the specialized header frame(s) 70 are shown transmitted during each time slot TS3-TS6, aspects of the disclosure can be included wherein only a subset of time slots include the specialized header frame(s) 70. During operation of the aircraft 10, the data destination 18 may send out requests to the data sources 20 for different periodic data groups 152, 252, 352. In this non-limiting example, data groups 152, 252, 352 can schematically represent periodic data, but aperiodic data can be included as data groups 152, 252, 352. Some periodic data groups 152, 252, 352 can be larger or smaller than others. For example, the first, second, and third data groups 152, 252, 352 can be transmitted over a subset of the time slots (shown as TS1 and TS2, possibly by concatenating the data frames in a single time slot).

Each data group 152, 252, 352, 452 can include one or more specialized header frame 70, and one or more payload data frame 72 which can further include one or more SBI 84, one or more payload data 56, one or more CRC 58, or one or more parity bit 59. The SBI 84 and the parity bit 59 of each of the payload data frames 72, of each data group 152, 252, 352, 452, can be, for example, 1 bit each, while the payloads 56 may use any percentage of the remaining 30 bits (in the 32 bit frame example). Alternatively, the specialized header 54, and the CRC 58 can be larger than 1 bit each. Further, the parity bit 59 can be excluded from the payload data frames 72 such that 31 bits of the 32 bits can be allocated to payload data 56. The payloads 56 can be of varying sizes depending on the payload data frame 72 from the data source 20. In some instances, the payload data frame 72 can take longer than the allocated time slot (TS1-TS6) to transmit the payload data frame 72. In this instance, the data grouping 152, 252, 352, 452 can spill over to subsequent time slots (TS1-TS6). In each subsequent time slot allotted for transmission of the data grouping 152, 252, 352, 452, the specialized header frame 70 can be presented then the remaining payload data frames 72 that can include the SBI 84 can reference the specialized header frame 70 such that the data destination 18 can continue to store the payload data 56 until the transmission is over no matter how many time slots (TS1-TS6) are needed to complete the full data payload transmission. As illustrated, the third and fourth data groupings 352, 452 extend over multiple time slots TS1-TS6. When the specialized data network 50 is unable to transmit all of the specialized header frames 70, and the payload data frames 72 within a single defined time slot TS1-TS6, the specialized data network 50 can transmit the remaining specialized header frames 70, and payload data frames 72 in a subsequent, or future time slot TS1-TS6.

The data source 20 can package the data groups 152, 252, 352, 452 in such a way that the data destination 18 can receive multiple full, or partial, data groups 152, 252, 352, 452 in a single 32 bit time slot TS1-TS6. For example, looking at only the first time slot TS1 and the second time slot TS2, the specialized data network 50 can include full data groups 152, 252 and a partial of the data group 352 in the first time slot TS1. The remaining portion of the data group 352 can then be received or requested by the data destination 18 in subsequent time slots, for example, the second time slot TS2. The remaining parts of the data group 352 can be presented in the second time slot TS2 by resending the specialized header frame 70, the remaining payload data frames 72, the CRC 58, and the parity bit(s) 59.

A white space 86 (e.g. otherwise unallocated or unutilized data transmission capacity of the specialized data network 50) can follow the CRC 58 (e.g., the end of the data transmission for a specific group) of any one or more of the data groups 152, 252, 352, 452. The white space 86 can be defined by the absence of transmission, or in other words, no grouped data is going into or out of either the data source 20 or the data destination 18. Alternatively, it can be beneficial to reduce or eliminate all white space 86. This can be done by after termination of the transmission or request of the data group 152, 252, 352, 452, and delivering or transmitting (or beginning to partially deliver) the subsequent data group 152, 252, 352, 452 instead of waiting until the next time slot TS1-TS6. For example, it can be beneficial to transmit or request the fourth data group 452 after termination of the third data group 352 in the first white space 86 instead of transmitting or requesting it in the third time slot TS3 as shown. It will be appreciated that this can be applied to any subsequent conforming data frames 52. For example, after termination of the fourth data group 452, a fifth data set (not shown), or any of the prior data groups 152, 252, 352 can be delivered or transmitted (or beginning to partially deliver) in the second white space 86. Alternatively, the white space 86 disclosed herein can be filled with an empty data set defined by a data set of data that can be completely ignored, or discarded by the data destination 18 (e.g., a data set of all 0's). This can provide the same effect as the use of the white space 86 as the data destination 18 will interpret the empty data set to be the same as a set of interweaved data. The data destination 18 will ignore the empty data set an continue looking for specialized header frames 70, or payload data frames 72, therefore, giving the empty data set the same use as the white space 86.

The specialized data network 50 can include the various specialized components outlined herein that increase the overall efficiency of data transmission across the specialized data network 50 of the aircraft 10. The specialized data network 50 can allow for a larger percentage of bits of a potential 32 bit data frame to be allocated toward data transfer of the payload. For example, conventional A429 systems data transfer can allow for 50% of the 32 bits to be allocated for payload transfer. The specialized data network 50 can allow for data transfer where up to 31 of the 32 bits (or for example, 30 bit, if utilizing the CRC 58) are allocated for payload transfer. It will be appreciated that the specialized data network 50 can be applied to any size system and still produce a more efficient data transfer system. It will be appreciated that this specialized data network can be applied to other ARINC systems with differing sizes and should not be limited to A429 systems.

In some ARINC systems, the SBI 84 can be more than 1 bit, defined by the first bit being in accordance with the binary identifier outlined herein, while the subsequent bits are bits to be ignored. This can be necessary in some ARINC systems, as the SBI 84 1 bit, placed next to the payload data 56 bits can create a conflicting bit-sequence, such as a conflicting or "collision" when coinciding with another predetermined bit sequence. For example, the ARINC system can include an executable demand that can be executed when the first 3 bits of a data frame read "100", so if the SBI 84 is "1" and the first two bits of the payload data 56 are "00", the ARINC system can read this is the executable demand instead of, or in addition to, the SBI 84 and the payload data 56 as it should. The same can occur in another relationship, wherein, for instance, and executable demand is received by the data destination 18 as a payload data frame 72.

Non-limiting aspects of the disclosure can be included to prevent the confliction or collision instances by way of a configuration file applied in the specialized data network 50. For example, a configuration file can be implemented and define a predetermined set or list of potentially conflicting bit streams such that, upon receiving a potentially conflicting bit stream, the data destination 18 can take additional actions or processes to ensure it is interpreted as desired. For instance, in the above-mentioned example, a data destination 18 can interpret the first 3 bits to be the SBI 84 by reading the potentially conflicting bit stream (e.g. "100", and then reading the following bits which can be enabled, operative, or otherwise configured or generated to confirm the intention of the bit stream in question. In this sense, collisions can be avoided, and the SBI 84 can effectively be utilized with addition bit indicators for a subset of possible bit streams that may result in collision or conflict. While these aspects would decrease the overall number of bits left for the payload data 56 for this subset of possible bit streams that may result in collision, the bits left for the payload data 56 can still be expanded when compared to conventional ARINC systems and allow, for example, for 29 bits of the 32 bits to be allocated for the payload data (and well as expanded in any payload data frames 72 without possibly colliding bitstreams). It will be appreciated that this is a non-limiting example, and the configuration file can be applied to any ARINC system and designate the SBI 84 to be any number of bits as required by the ARINC system.

An additional improvement can be that the specialized data network 50 can reduce or eliminate white (or otherwise unutilized or underutilized) space 86 and can allow for multiple data groups 152, 252, 352, 452 to be either transmitted, or received from either the data source 20 or the data destination 18 consecutively or concatenated in the same time slot TS1-TS6. This can further increase the overall efficiency of the data transfer system for the aircraft 10.

Figure 6:
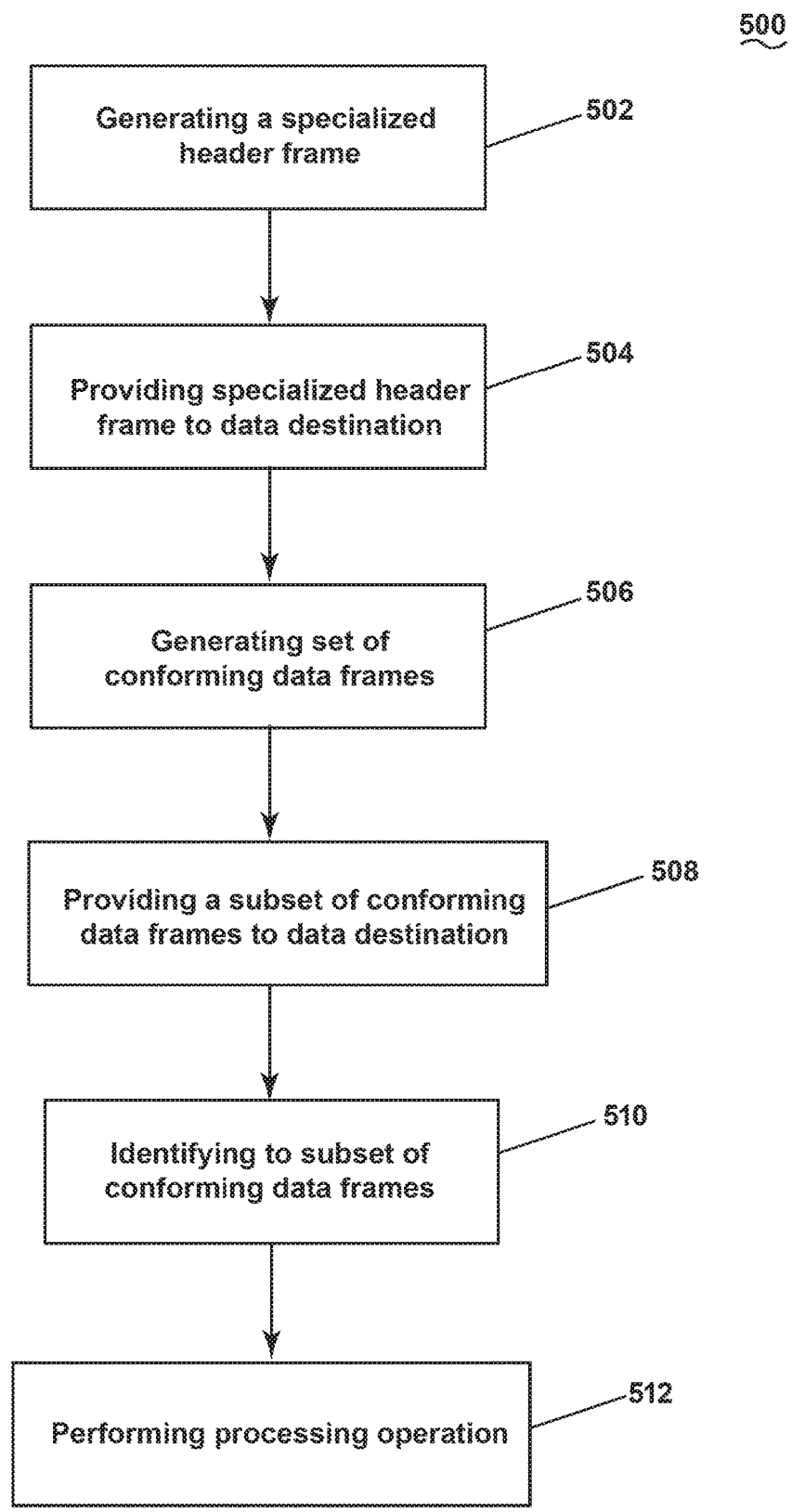
FIG. 6 is a flow chart showing a method of transmitting a set of conforming data frames in a specialized data network, in accordance with various aspects described herein.

FIG. 6 is a flow diagram of the method 500 of transmitting a set of payload data frames 72 in a specialized data network 50 in accordance with FIG. 3. During operation of the aircraft, there can be a request or transmission of either aperiodic or periodic conforming data frames 52. When this occurs, the data source 20 can generate at least one specialized header frame 70 indicating imminent data transfer of the set of payload data frames 72, at 502. From there, at least one specialized header frame 70 can be provided, or transmitted to the data destination 18 by way of the specialized data network 50, at 504. The payload data frames 72 can then be generated at the data source 20, and each set of payload data frames 72 can be identified by an SBI 84, at 506. The subset of payload data frames 72 can then be provided to the data destination 18 by way of the specialized data network 50, at 508. The subset of payload data frames 72 can then be identified by the data destination 18 by way of the SBI 84, at 510. Further, each subset of payload data frames 72 can then be stored in various memory components such as, but not limited to, RAM, ROM, flash memory, or one or more different types of portable electronic memory, such as discs, DVDs, CD-ROMs, etc., or any suitable combination of these types of memory, at 510. Processing operations can then be performed on the one or more subsets of payload data frames 72, at 512. Processing operations can be done by way of a controller module.

The sequence depicted is for illustrative purposes only and is not meant to limit the method 500 in any way as it is understood that the portions of the method can proceed in a different logical order, additional or intervening portions can be included, or described portions of the method can be divided into multiple portions, or described portions of the method can be omitted without detracting from the described method. For example, the method 500 can further include determining if the full set of payload data frames 72 can be presented in a single time slot (e.g. TS3), and if it cannot be, presenting the remaining payload data frames 72 in a subsequent time slot (e.g. TS4, TS5, TS6, etc.).

Many other possible aspects and configurations in addition to that shown in the above figures are contemplated by the present disclosure.

To the extent not already described, the different features and structures of the various aspects can be used in combination with others as desired. That one feature cannot be illustrated in the aspects is not meant to be construed that it cannot be, but is done for brevity of description. Thus, the various features of the different aspects can be mixed and matched as desired to form new aspects, whether or not the new aspects are expressly described. All combinations or permutations of features described herein are covered by this disclosure.

This written description uses examples to disclose aspects of the disclosure, including the best mode, and also to enable any person skilled in the art to practice the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects of the invention are provided by the subject matter of the following clauses:

1. A method for transmitting a set of conforming data frames in a specialized data network, the method comprising: generating, at a data source, at least one specialized header frame indicating imminent data transfer of the set of conforming data frames, providing the at least one specialized header frame to a data destination, by way of the specialized data network, generating, at the data source, the set of conforming data frames, wherein each of the set of conforming data frames is indicated as one of the set of conforming data frames by a single bit indicator, providing at least a subset of the conforming data frames to the data destination, by way of the specialized data network, identifying the subset of conforming data frames, by the data destination, by way of the single bit indicator of each of the subset of conforming data frames, and storing the subset of the conforming data frames identified, and performing processing operations on the stored subset of conforming data frames.

2. The method of any preceding clause wherein the specialized data network is an avionics-specific data network.

3. The method of any preceding clause wherein the avionics-specific data network is an ARINC-compatible data network.

4. The method of any preceding clause wherein the avionics-specific data network is an ARINC 429 (A429) compatible data network.

5. The method of any preceding clause wherein the specialized data network is a deterministic data network.

6. The method of any preceding clause wherein the specialized data network is a broadcast-style bus.

7. The method of any preceding clause wherein the specialized data network defines a time slot limiting an amount of time the data source has to generate the at least one specialized header frame, provide the at least one specialized header frame to the data destination, generate the set of conforming data frames, and providing the subset of the conforming data frames to the data destination.

8. The method of any preceding clause, further comprising, when unable to provide a full set of the conforming data frames to the data destination by an expiration of the time slot, further providing the remaining subset of the conforming data frames to the data destination in a future specialized data network time slot of the data source.

9. The method of any preceding clause, wherein another set of data frames is provided to the specialized data network by a set of other data sources, the another set of data frames indicated as not one of the set of conforming data frames by the single bit indicator, wherein the another set of data frames are interweaved with the subset of conforming data frames during transmitting, and wherein the another set of data frames are ignored by the data destination.

10. The method of any preceding clause wherein each frame of the data network is 32 bits.

11. The method of any preceding clause wherein the set of conforming data frames can be transmitted based on a periodic schedule.

12. The method of any preceding clause wherein the set of conforming data frames can be transmitted aperiodically.

13. An avionics-specific specialized data network, comprising: a data source configured to, generate at least one specialized header frame indicating imminent data transfer of a set of conforming data frames, transmit the at least one specialized header frame to the data network, generate the set of conforming data frames, wherein each of the set of conforming data frames is indicated as one of the set of conforming data frames by a single bit indicator, transmit at least a subset of the conforming data frames to the data network, and a data destination configured to: receive a transmission of the at least one specialized header frame from the data network, begin listening for the at least a subset of the conforming data frames by identifying data frames received from the data network based on the single bit indicator of each data frame received, store the subset of conforming data frames received when the single bit indicator identifies the received data frame is one of the set of conforming data frames, and performing processing on the stored subset of conforming data frames.

14. The specialized data network of any preceding clause wherein the specialized data network is an ARINC 429 (A429) compatible data network.

15. The specialized data network of any preceding clause, further comprising specialized data network switching fabric interconnecting the data source with the data destination.

16. The specialized data network of any preceding clause wherein the data destination is an electronic flight bag.

17. The specialized data network of any preceding clause, further comprising a configuration file for the data definition, the configuration file defining a predetermined set of conflicting bit streams headers overlapping with the single bit indicator, and wherein the data destination operably identifies received data wherein the at least one specialized header frame includes one of the predetermined set of conflicting bit streams.

18. The specialized data network of any preceding clause wherein the at least one specialized header frame defines a number of conforming data frames of the set of conforming data frames.

19. The specialized data network of any preceding clause wherein the specialized data network defines a time slot limiting an amount of time the data source has to transmit at least a subset of the conforming data frames to the specialized data network.

20. The specialized data network of any preceding clause wherein the data source, when unable to transmit at a full set of the conforming data frames to the specialized data network by an expiration of the time slot, is further configured to transmit the remaining subset of the conforming data frames to the specialized data network in a future time slot of the data source.

What is claimed is:

1. A method for transmitting a set of conforming data frames in a specialized data network, the method comprising:
    generating, at a data source, at least one specialized header frame indicating imminent data transfer of the set of conforming data frames;
    providing the at least one specialized header frame to a data destination, by way of the specialized data network;
    generating, at the data source, the set of conforming data frames, wherein each of the set of conforming data frames is indicated as one of the set of conforming data frames by a single bit indicator;
    providing at least a subset of the conforming data frames to the data destination, by way of the specialized data network;
    identifying the subset of conforming data frames, by the data destination, by way of the single bit indicator of each of the subset of conforming data frames, and storing the subset of the conforming data frames identified; and
    performing processing operations on the stored subset of conforming data frames.

2. The method of claim 1 wherein the specialized data network is an avionics-specific data network.

3. The method of claim 2 wherein the avionics-specific data network is an ARINC-compatible data network.

4. The method of claim 3 wherein the avionics-specific data network is an ARINC 429 (A429) compatible data network.

5. The method of claim 1 wherein the specialized data network is a deterministic data network.

6. The method of claim 1 wherein the specialized data network is a broadcast-style bus.

7. The method of claim 6 wherein the specialized data network defines a time slot limiting an amount of time the data source has to generate the at least one specialized header frame, provide the at least one specialized header frame to the data destination, generate the set of conforming data frames, and providing the subset of the conforming data frames to the data destination.

8. The method of claim 7, further comprising, when unable to provide a full set of the conforming data frames to the data destination by an expiration of the time slot, further providing the remaining subset of the conforming data frames to the data destination in a future specialized data network time slot of the data source.

9. The method of claim 1, wherein another set of data frames is provided to the specialized data network by a set of other data sources, the another set of data frames indicated as not one of the set of conforming data frames by the single bit indicator, wherein the another set of data frames are interweaved with the subset of conforming data frames during transmitting, and wherein the another set of data frames are ignored by the data destination.

10. The method of claim 1 wherein each frame of the specialized data network is 32 bits.

11. The method of claim 1 wherein the set of conforming data frames can be transmitted based on a periodic schedule.

12. The method of claim 2 wherein the set of conforming data frames can be transmitted aperiodically.

13. An avionics-specific specialized data network, comprising:
    a data source configured to:
    generate at least one specialized header frame indicating imminent data transfer of a set of conforming data frames;
    transmit the at least one specialized header frame to the data network;
    generate the set of conforming data frames, wherein each of the set of conforming data frames is indicated as one of the set of conforming data frames by a single bit indicator;
    transmit at least a subset of the conforming data frames to the data network; and
    a data destination configured to:
    receive a transmission of the at least one specialized header frame from the data network;

begin listening for the at least a subset of the conforming data frames by identifying data frames received from the data network based on the single bit indicator of each data frame received;

store the subset of conforming data frames received when the single bit indicator identifies the received data frame is one of the set of conforming data frames; and performing processing on the stored subset of conforming data frames.

14. The avionics-specific specialized data network of claim 13 wherein the specialized data network is an ARINC 429 (A429) compatible data network.

15. The avionics-specific specialized data network of claim 13, further comprising specialized data network switching fabric interconnecting the data source with the data destination.

16. The avionics-specific specialized data network of claim 13 wherein the data destination is an electronic flight bag.

17. The avionics-specific specialized data network of claim 13, further comprising a configuration file for the data destination, the configuration file defining a predetermined set of conflicting bit streams overlapping with the single bit indicator, and wherein the data destination operably identifies received data wherein the at least one specialized header frame includes one of the predetermined set of conflicting bit streams.

18. The avionics-specific specialized data network of claim 13 wherein the at least one specialized header frame defines a number of conforming data frames of the set of conforming data frames.

19. The avionics-specific specialized data network of claim 13 wherein the specialized data network defines a time slot limiting an amount of time the data source has to transmit at least a subset of the conforming data frames to the specialized data network.

20. The avionics-specific specialized data network of claim 19 wherein the data source, when unable to transmit at a full set of the conforming data frames to the specialized data network by an expiration of the time slot, is further configured to transmit the remaining subset of the conforming data frames to the specialized data network in a future time slot of the data source.

* * * * *